United States Patent

[11] 3,574,316

[72] Inventors Walter Siepmann;
   Walter Siepmann, Jr., Haus Mohnetal;
   Hans-Jurgen Vogt, Kulbe 21, 4785
   Belecke (Mohne); Herbert Sobota, Unterm
   Hagen 2, Warstein, Sauerl, Germany
[21] Appl. No. 786,922
[22] Filed Dec. 26, 1968
[45] Patented Apr. 13, 1971
[32] Priority Apr. 19, 1968
[33] Germany
[31] P 17 55 270.4

[54] MAIL MESH
   18 Claims, 4 Drawing Figs.
[52] U.S. Cl. .................................................... 152/231,
   152/243
[51] Int. Cl. ........................................................ B60c 27/06
[50] Field of Search .......................................... 245/4;
   152/170, 171, 196, 201, 208, 231, 232, 243, 244

[56] References Cited
   UNITED STATES PATENTS
D.35,057 9/1901 Cottle ........................... 245/4
990,253 4/1911 Goldsmith ..................... 245/4
   FOREIGN PATENTS
83,957 5/1921 Austria ......................... 245/4

Primary Examiner—Richard J. Herbst
Attorney—Michael S. Striker

ABSTRACT: A protective mail mesh, which is particularly suitable for protecting vehicle tires, comprises a plurality of one-piece members each having at least two closed loop portions and a connecting portion connecting the same. Each loop portion has an opening which is so dimensioned as to permit sliding insertion of a loop portion of another of the members only when the loop portions of the respective members have a predetermined orientation with reference to one another. Each loop portion has two integral sections one of which is closer to and the other of which is farther from the associated connecting portion and the general planes of at least the other sections of the loop portions are at least substantially coincident with one another. Each connecting portion of each of the members extends through and is at least in part slidably accommodated in a loop portion of at least one other of the members whereby all of them are connected movable with reference to each other and together constitute a mail mesh.

MAIL MESH

CROSS REFERENCE TO RELATED APPLICATIONS

A related application has been filed on Dec. 26, 1968 under the title "PROTECTIVE MAIL MESH;" it has Ser. No. 786,931.

BACKGROUND OF THE INVENTION

The present invention relates to generally to a mail mesh and more particularly to a protective mail mesh which is especially suitable for protecting vehicle tires.

In our above-identified copending application, we have disclosed a protective mail mesh intended to be placed, about a vehicle tire to protect the same against damage on rough terrain, for instance by rocks or the like, and/or to increase traction on soft or muddy ground. By contrast to conventional tire chains we have chosen the expression "mail mesh" for our invention because conceptually the invention differs from conventional tire chains.

Because of the configuration of the individual one-piece members from which our novel protective mail mesh is assembled, the mesh can be assembled without any need for welding or other operation simply by inserting portions of one member through an opening in a loop portion of another member and then changing the orientation of the members with respect to one another so as to preclude undesired withdrawal from the opening.

The many advantages obtained with our novel protective mail mesh have been discussed in detail in the aforementioned copending application to which reference may be had.

However, the protective mail mesh disclosed in the aforementioned copending application does require the use of more than a single type of one-piece member, that is the two types must be configurated differently to permit one to obtain, on assembly, a protective mail mesh having the desired characteristics. This requires that at least two different types of one-piece members according to the invention are available at all times to assemble protective mail mesh therefrom. Evidently, it would be advantageous to eliminate this need and to be able to assemble a protective mail mesh from a single type of one-piece member according to the present invention, without the necessity for having differently configurated members available.

SUMMARY OF THE INVENTION

It is, accordingly, an object of the present invention to provide a protective mail mesh which possesses these advantages.

A more specific object of the present invention is to provide such a protective mail mesh which consists of a plurality of one-piece members each of which is so configurated that it can be assembled with other similarly configurated and dimensioned one-piece members without requiring any differently configurated or differently dimensioned members.

An additional object of the invention is to provide such a protective mail mesh which has smaller mesh openings for interstices than was possible with the construction set forth in our copending application.

A further object of the invention is to provide such a protective mail mesh which has improved ability to conform itself to the contour of the vehicle tire and of the terrain on which the tire travels.

In pursuance of the above objects, and others which will become apparent hereafter, one feature of our invention resides in the provision of a protective mail mesh, particularly suitable for use on vehicle tires, which comprises a plurality of one-piece members each of which consists of two closed loop portions and a connecting portion connecting the same. Each loop portion of each member is provided with an opening which is so dimensioned as to permit sliding insertion therethrough of a loop portion of another of the members but only when the loop portions of the respective members have a predetermined orientation with reference to one another. Once this is accomplished, the loop portion accommodates slidably within its opening at least a part of the associated connecting portion of the other member.

In accordance with our invention, each of the loop portions comprises two integral sections one of which is closer to and the other of which is farther from the associated connecting portion and the general planes of at least the respective other sections of the loop portions of the respective members are at least substantially coincident with one another.

Each connecting portion of each of the members extends through and is at least in part slidably accommodated in a loop portion of at least one other of the members so that all of the members are connected movable with respect to each other and together constitute a mail mesh.

A mail mesh assembled from a plurality of members configurated according to our present invention can be assembled exclusively of such members having identical configuration and identical dimensions. It is not necessary to utilize differently configurated or differently dimensioned members of any type with the highly advantageous result that only a single type and size of member need be manufactured and kept in stock.

Furthermore, the assembly of a protective mail mesh from the members according to the present invention is still further simplified because there is obviously no need to carefully select a particular member which must be assembled in a predetermined relationship with respect to the other members. In accordance with the present invention, only a single type and dimension of members is provided and of course this greatly facilitates the assembly of a mail mesh from such members.

Furthermore, a mail mesh assembled from members according to the present invention will have smaller mesh openings or interstices than is possible with the construction set forth in our copending application and this is advantageous because it provides still better protection of the vehicle tire against damage by sharp rocks or the like.

An additional advantage of the mail mesh according to the present invention is to be seen in the fact that the particular configuration of its one-piece members assures for the mail mesh assembled therefrom an excellent ability to conform itself to the tire surface, even if the tire undergoes constant and severe deformation during operation of the vehicle. This advantageous construction is possible because of the particularly short and compact form of the one-piece members according to the present invention. Also, the form of the one-piece members according to the present invention assures that no tilting of the individual members will occur when the tire rests on them, so that for instance if the tire rolls over any one of the members of which the mail mesh is assembled and momentarily confines it between the tire surface and the surface of the ground, tilting of the thus-loaded member will not occur and deformations or breaking of the individual members which would be the result of such tilting are thereby avoided. Finally, there is also the additional advantage that the members configurated according to the present invention are particularly simple to manufacture, particularly through a forging operation, and this of course advantageously influences the expenses involved in manufacturing and selling a mail mesh according to the present invention.

In a preferred embodiment of our invention, the one-piece members are so configurated that the general planes of their closed loop portions are curved with the result that the lateral arms or legs bounding the loop portions—and which are of course also curved—have a considerably greater length than would be the case in a straight loop portion. This, in turn, advantageously influences the lifetime of the individual members and the mail mesh assembled therefrom because the resistance to wear of the thus-configurated portions, which contact the ground and on which the tire is supported, is increased over straight loop portions having openings of similar dimensions. Moreover, this curvature makes it impossible for the individual members to become entangled in undesirable manner once they have been assembled into a mail mesh. Because of the curved configuration of their loop portions, the individual members will always have a tendency to move towards their predetermined position within the context of the mail mesh. Such undesirable entangling of individual members in the context of the mail mesh would be possible only if two adjacent individual members were to be tilted through a relatively large angle of substantially 90° in opposite directions; however, this is impossible in the actual use of the mail mesh when the same is mounted on a tire, and the highly undesirable entangling of the individual members with the resulting deformations or even breakage of same members is thereby completely eliminated.

Each of the loop portions of the individual loop members according to the present invention comprises two integral sections one of which is closer to and the other of which is farther from the associated connecting portion. We have found it to be advantageous if the general planes of the respective one sections, that is the one closest to the connecting portion, are inclined towards one another at an acute angle of between substantially 5° and 45°, preferably on the order of 30°. However, it is also possible to so construct the one-piece members that in the aforementioned one sections the general planes extend in substantial parallelism with one another. The connecting portion that is never straight, but always bent or curved and we prefer in all embodiments that the general planes of the respective associated loop members extend substantially normal to the plane in which the connecting portion is curved.

We have found it advantageous if the curvature or deformation of the connecting portion is such that the latter outlines a substantially trapezium-shaped configuration. This has the advantage that, when the connecting portion is in part received within the confines of a loop portion of another member, the configuration of the connecting portion alone will tend to urge the loop portion of the other member towards its predetermined position so that, if for instance two loop portions of adjacent members surround the thus-configurated connecting portion, they will have a tendency to move slidably towards one another. This assures that the members from which the protective mail mesh is assembled will have a tendency to maintain their predetermined positions or, if these positions have been changed as a result of forces acting exteriorly, they will then tend to return to these positions. However, other configurations are possible for the connecting portion, and include a substantially U-shaped configuration or a polygonal configuration where the polygon has advantageously rounded corners. The connecting portion, can also be arcuately curved on one or several relatively large radii.

It is advantageous to so configurate one-piece members according to the present invention that the length of the opening in each of the loop portions is at least equal to but preferably larger than the total width of the loop portion measured in the general plane thereof. This assures that each portion of each member can be passed through each opening of a loop portion of any other member, but only if the respective members have a predetermined orientation with respect to one another.

It is further advantageous if the length of the opening in each of the loop portions is at least twice that and preferably larger than the thickness of the connecting portion measured in direction substantially normal to the general planes of the loop portions. This guarantees relatively large play between the outer surface of the connecting portion and the surfaces bounding the respective openings in the loop portions where two or more of the members are connected with one another in the manner already outlined. This, in turn, means that the thus-connected members have not only freedom of axial movement of the respective loop portion with respect to the connecting portion of an associated connected member, but also freedom of radial movement, whereby the resulting mail mesh has particularly great flexibility and is capable of particularly well conforming itself to the curvature of the tire as well as to the surface contour of the terrain.

In an advantageous embodiment of the invention the relationship between the length of the loop portions and the length of the opening surrounded by the curved or otherwise bent connecting portion, both measured in the plane of symmetry of the respective member, will be between substantially 8:1 and 2:1, preferably on the order of 7:1. The width of the opening or aperture surrounded by the bent connecting portion, measured normal to the plane of symmetry of the member, is advantageously at least equal to but preferably larger than twice the thickness of the loop portions measured in direction normal to their general plane. This assures that the members can readily assembled with one another and will provide a protective mail mesh which on the one hand has a relatively large contact surface both for the vehicle tire and the terrain, but on the other hand has mesh openings or interstices which are still large enough to assure self-cleaning of the mesh. The length of that part of the connecting portion which extends through the openings in one or more loop portions of other members with which it is to be connected should not be significantly larger than double the thickness of the loop portions measured normal to their general plane because it is not desirable that the connecting portion be particularly long. Evidently, a relatively short connecting portion has greater resistance to than a longer connecting portion and this in turn very advantageously influences the dimensional and configurational stability of the individual members and therefore of the mail mesh assembled from the same.

The dimension of one of the members according to the present invention, measured in the common or coincident plane of symmetry of its loop portions or of such sections of the loop portions which have coincident general planes, is advantageously double the sum of the lengths of the loop portions and the connecting portion as measured in the plane of symmetry of the member which extends normal to the coincident general planes. This eliminates the need for providing separate compensating members when the mail mesh is assembled.

A mail mesh, according to the present invention, can be assembled from the one-piece members of our invention without requiring any other elements except for connecting members which join the opposite ends of the mesh. Thus, such a mail mesh utilizes only a single configuration and dimension of our one-piece members and is particularly simple to construct and to assemble, and of course this significantly reduces the expenses involved in manufacturing the members, stocking them and assembling them into a mail mesh.

The method according to our invention provides for assembling a protective mail mesh of the type under discussion from a plurality of our herein disclosed one-piece members without the use of any welded connections. This is accomplished simply by inserting a loop portion of one member through the opening of a loop portion of another member when these loop portions or members have a predetermined orientation with reference to one another, and thereupon changing this orientation of the loop portions or members to prevent accidental or undesired separation of the members. This eliminates the many disadvantages of the prior art which have already been discussed in our aforementioned copending application.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
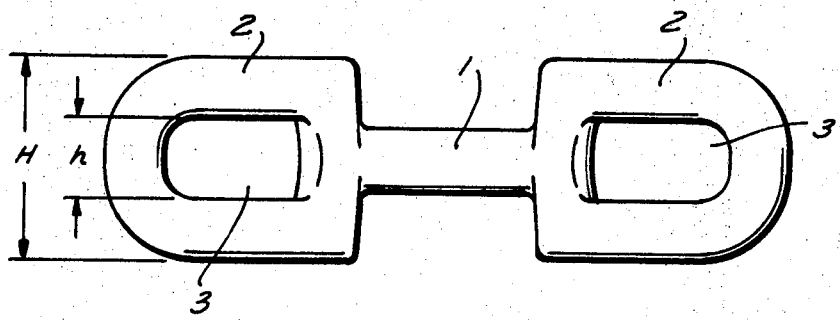
FIG. 1 is a bottom-plan view of the embodiment of FIG. 2 and showing a one-piece member constructed according to our invention.
Figure 2:
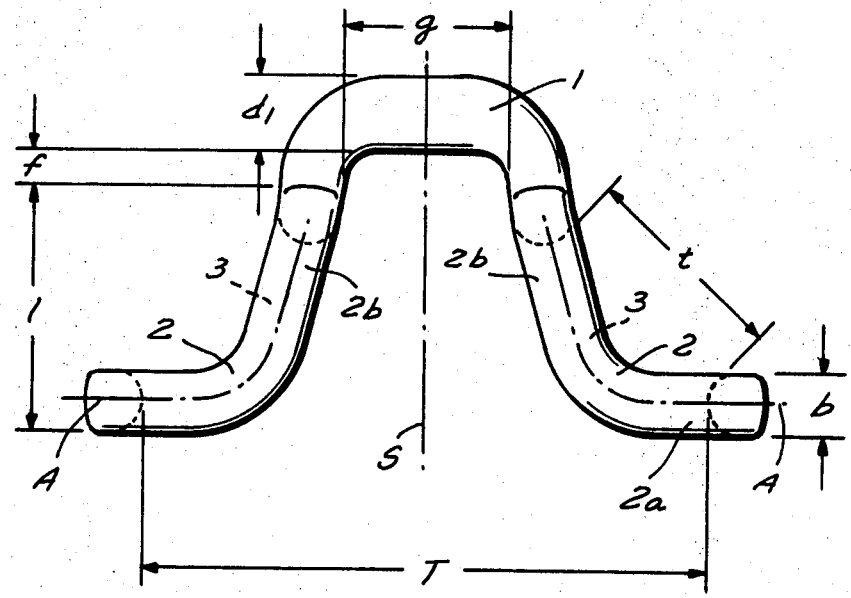
FIG. 2 is a side elevation of the member shown in FIG. 1.

Discussing now the drawing in detail, and firstly FIGS. 1 and 2 thereof, it will be seen that we have illustrated therein in two different views the one-piece member according to our present invention. It consists of a connecting portion 1 and two loop portions 2 which are closed and which are provided at the opposite ends of the connecting portion 1 with which they are of one piece. Each of the loop portions 2 is provided with an opening 3. In the illustrated embodiment the connecting portion 1 is curved or bent into a substantial U-shaped outline. It will be seen, however, that the arms or legs of U are relatively short (compare FIG. 2). By contrast, the loop portions 2 are relatively long as clearly evident from FIG. 2 and their respective general planes A are curved as indicated in FIG. 2.

Each loop portion 2 includes two integral sections 2a and 2b of which the one identified with reference numeral 2b is closer to and the one identified with reference numeral 2a is farther from the loop-connecting portion 1.

In the illustrated embodiment the general planes of the respective sections 2a of the loop portions 2 are coincident with one another. However, they need not be entirely coincident with one another but could be substantially coincident, which is to say that they could be slightly inclined with reference to one another. The general planes of the respective sections 2b on the other hand, are inclined with reference to one another at an acute angle.

The width of the opening 3 in each of the loop portions 2 is identified in FIG. 1 with $h$ and the length of each opening, as seen in direction normal to the width thereof, is identified with $d$ (see FIG. 2). The total width of the loop portions 2 is identified with $H$ and it is clear that the length $t$ is at least equal to but preferably larger than the total width $H$ measured in the general planes A of the loop portions 2. Additionally, the length $t$ of each opening 3 is at least twice and preferably more than twice the thickness $d_1$ of the connecting portion 1 (compare FIG. 2) measured in direction substantially normal to the general planes of the loop portions 2.

FIG. 2 also illustrates the plane of symmetry S of the individual one-piece members. It will be seen that the length of each loop portion 2 measured in the direction of the plane of symmetry S is identified with 1 and that the length—also measured in the plane of symmetry S—of the aperture surrounded and outlined by the bent connecting portion 1 is identified with $f$. In the embodiment illustrated in FIGS. 1 and 2, the relationship between the dimensions 1 and $f$ is on the order of 7:1.

The dimension $g$ identifies the width of the aperture surrounded and outlined by the connecting portion 1, as measured in direction transversely of the plane of symmetry S. It corresponds to the length of the part of the connecting portion 1 which may be accommodated within the openings 3 of loop portions of other members with which the illustrated member is to be connected. The dimension $g$ is at least equal to twice the thickness $b$ of the loop portions 2 measured in direction normal to their respective general planes A, and preferably it is more than twice that thickness.

Figure 3:
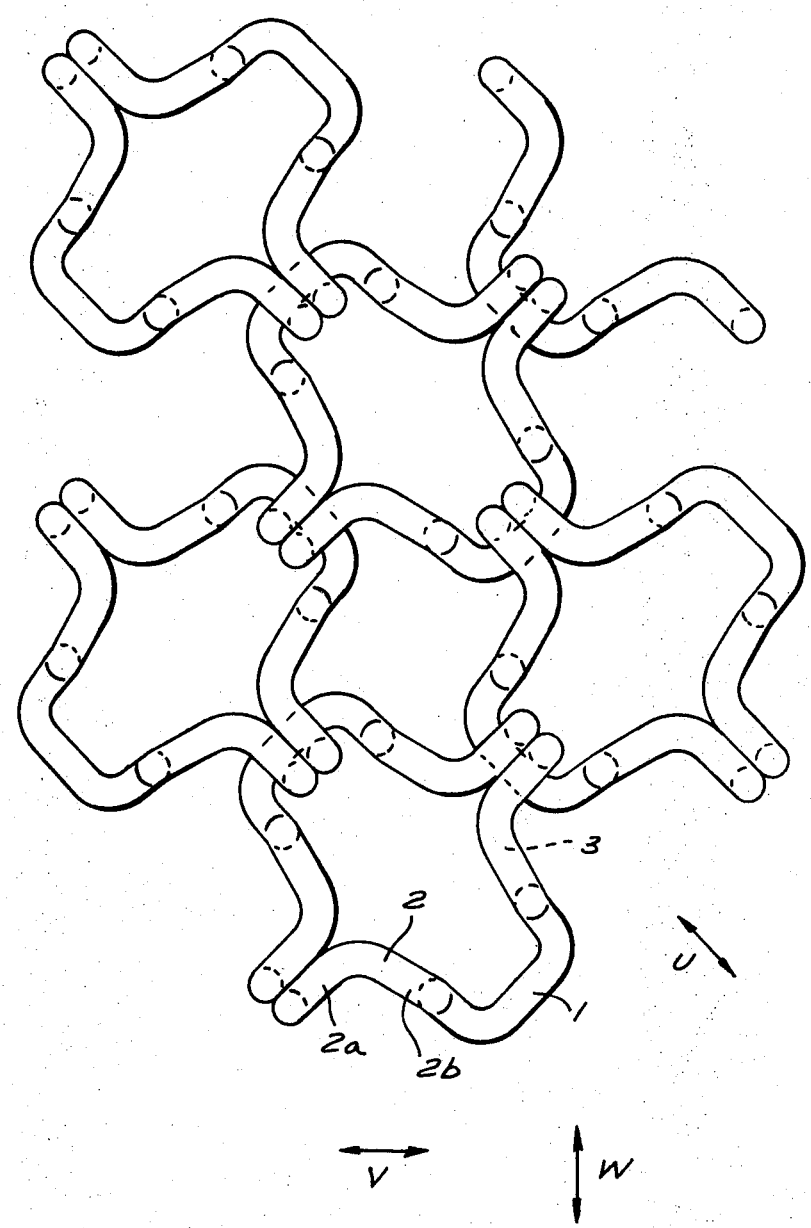
FIG. 3 is a fragmentary detailed view illustrating a plurality of the members shown in FIGS. 1 and 2 assembled into a portion of a protective mail mesh.

Coming now to FIG. 3 it will be seen that we have illustrated therein a fragment of a mail mesh assembled, relative to the members shown in FIG. 1 and 2. How the members are connected with one another is clearly evident, as is the fact that they cannot accidentally become separated despite the fact that they are not provided with any welded connections at all. With the mesh assembled as shown in FIG. 3, the direction of rotation of a tire onto which it is placed may be either that indicated by the arrow $u$, that indicated by the arrow $v$, or that indicated by the arrow $w$. In other words, the mesh may be placed onto the tire that it has such an orientation with respect to the direction of rotation thereof as indicated by the respective arrows. The possibilities indicated by the arrows $v$ and $w$ are preferred and in these cases the loop portions 2 on which the tire will be supported extend with their respective sections 2a and 2b always under an angle of substantially 30° to 45° to the direction of rotation of the tire, whereas in the case indicated with the arrow $u$ they are so oriented as to extend either in the direction $u$ or transversely thereof, depending upon the particular position of the individual member in the context of the mesh.

Figure 4:
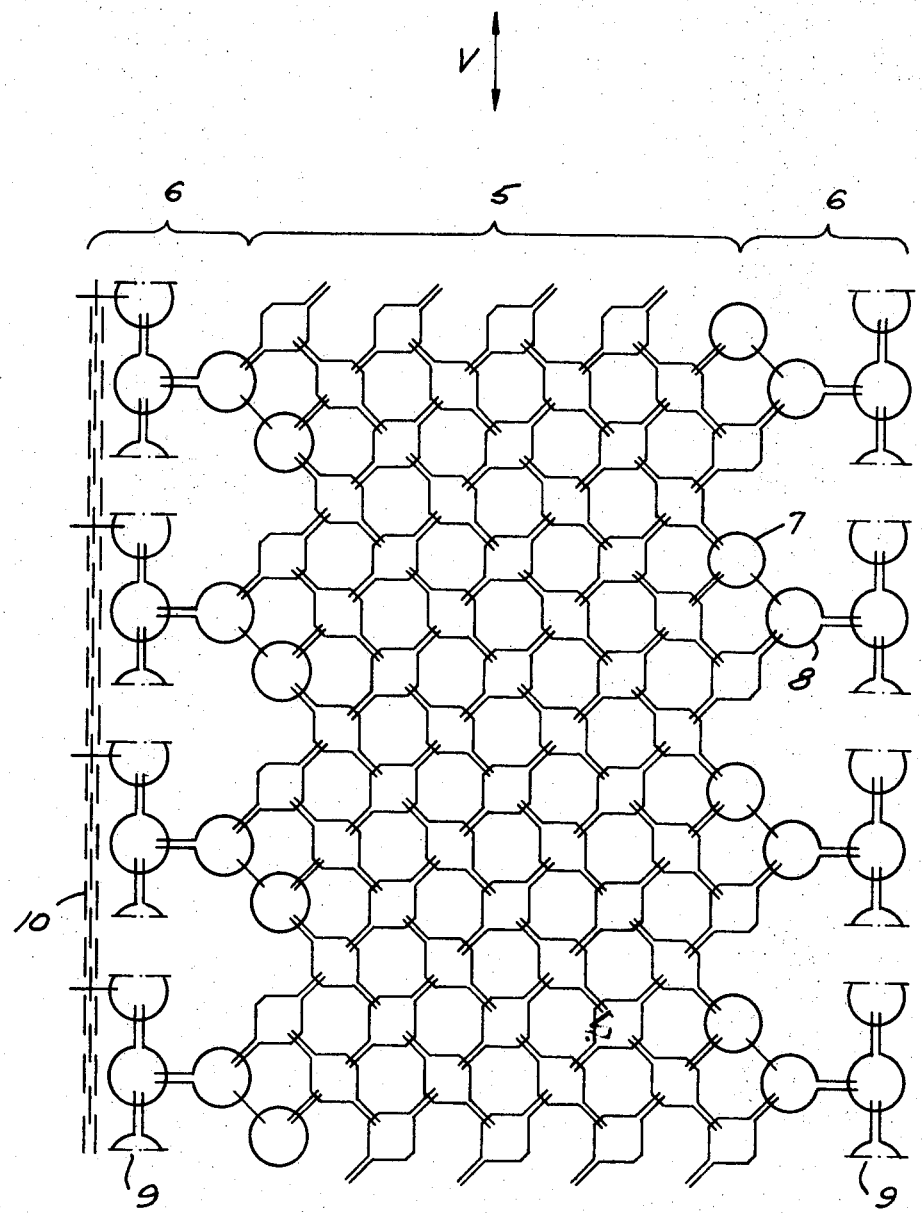
FIG. 4 is a somewhat diagrammatic plan view of a larger section of a protective mail mesh assembled from the members shown in FIGS. 1 and 2.

FIG. 4, finally, is a fragmentary illustration of a completely assembled mail mesh utilizing the members illustrated in FIGS. 1 and 2. The direction of rotation of the tire on which the mesh is assumed to be placed is indicated by the arrows $v$. That section of the mesh which surrounds the tread face of the tire and actually contacts the ground is identified with reference numeral 5 and two lateral sections which overlie the side faces of the tire are identified with reference numeral 6. It will be seen that the section 5 of the mesh consists exclusively of members of the type shown in FIGS. 1 and 2, but that the sections 6 consist of members identified with reference numerals 7 and 8 which are clearly differently configurated from the ones shown in FIGS. 1 and 2 of the present application, but which have been disclosed in detail in our aforementioned copending application. FIG. 4 clearly illustrates that the different members 7 and 8 can be assembled without any difficulty with the members shown in FIGS. 1 and 2 of the present application to thereby link the lateral sections 6 of the mesh with the tread-protecting section 5 thereof. Provision of the members 8 makes it possible to tilt the lateral sections 6 substantially normal to the plane of the drawing and enables their assembly into strands 9 which constitute the lateral delineation of the sections 6 and on which a tensioning chain 10 may be secured. The use of these members 7 and 8 makes it possible for the lateral sections 6 of the mesh to more precisely conform to the exterior configuration of the vehicle tire and the region of the tire shoulder.

It will be understood that each of the elements described above, or two or more together, may also find a useful application in other types of constructions differing from the types described above.

While the invention has been illustrated and described as embodied in a protective mail mesh, it is not intended to be limited to the details shown, since various modifications and structural changes may be made without departing in any way from the spirit of the present invention.

We claim:

1. A protective mail mesh for vehicle tires, comprising a plurality of one-piece members each consisting of two closed elongated loop portions and a connecting portion connecting the latter, each of said loop portions of each of said members being provided with an opening so dimensioned as to permit sliding insertion therethrough of a loop portion of another of said members only when the loop portions of said members have a predetermined orientation with reference to one another, and to slidably accommodate at least a part of the associated connecting portion of said other member, each of said loop portions comprising two integral sections one of which is closer to and the other of which is farther from the associated connecting portion at least the respective other sections of the two loop portions of each of said members being at least substantially located in a general plane common to them and curved in direction longitudinally of the respective loop portions, and each connecting portion of each of said members extending through and being at least in part slidably accommodated in a loop portion of at least one other of said plurality of members, whereby all of said members are connected movable with respect to each other and together constitute a mail mesh.

2. A protective mail mesh as defined in claim 1, said one sections of the loop portions having respective general planes, and the general planes of said one sections of the loop portions of each member being inclined with reference to one another.

3. A protective mail mesh as defined in claim 2, wherein said general planes of said one sections are inclined at an acute angle with reference to one another.

4. A protective mail mesh as defined in claim 2, wherein said general planes of said one sections are inclined with reference to one another at an angle of between substantially 5° and 45°.

5. A protective mail mesh as defined in claim 4, wherein said angle is on the order of 30°.

6. A protective mail mesh as defined in claim 1, said one sections of the loop portions having respective general planes, and the general planes of said one sections of the loop portions of each member extending in substantial parallelism with one another.

7. A protective mail mesh as defined in claim 1, said connecting portion being curved in a predetermined plane, and said one sections of the associated loop portions having respective general planes extending substantial normal to said predetermined plane.

8. A protective mail mesh as defined in claim 1, wherein said connecting portion is of substantially trapezium-shaped outline.

9. A protective mail mesh as defined in claim 1, wherein said connecting portion is of substantially U-shaped outline.

10. A protective mail mesh as defined in claim 1, wherein said connecting portion has substantially polygonal outline.

11. A protective mail mesh as defined in claim 10, wherein said connecting portion defines substantially the outline of a polygon having rounded corners.

12. A protective mail mesh as defined in claim 1, wherein said connecting portion is arcuately curved on at least one relatively large radius.

13. A protective mail mesh as defined in claim 1, wherein said connecting portion is arcuately curved on a plurality of relatively large radii.

14. A protective mail mesh as defined in claim 1, wherein the length of said openings measured in direction normal to their width is at least equal to the overall width of said loop portions measured in the general plane thereof.

15. A protective mail mesh as defined in claim 1, wherein the length of said openings measured in direction normal to their width is at least double the thickness of said connecting portion measured in direction substantially normal to the general planes of said loop portions.

16. A protective mail mesh as defined in claim 1, wherein said connecting portion is of other-than-straight configuration and provides a circumferentially incomplete outline of an aperture, and wherein the length of said loop portions in direction of the plane of symmetry of the respective member is in a ratio of between substantially 8:1 to 7:1 with reference to the length of said aperture in the same direction.

17. A protective mail mesh as defined in claim 1, wherein said connecting portion is of other-than-straight configuration and provides a circumferentially incomplete outline of an aperture, and wherein the width of the thus outlined aperture, measured in direction substantially normal to the plane of symmetry of said member, is substantially double the thickness of the loop portions measured normal to the general planes thereof.

18. A protective mail mesh as defined in claim 1, wherein said connecting portion is of other-than-straight configuration and provides a circumferentially incomplete outline of an aperture, and wherein the sum of the lengths of said aperture and of the respective loop portions measured in the plane of symmetry of the respective member is at most equal to half the distance between the farthest spaced ends of said openings measured in said general planes which extend substantially normal to said plane of symmetry.